United States Patent
Sundaram et al.

(10) Patent No.: US 9,487,337 B2
(45) Date of Patent: *Nov. 8, 2016

(54) LAYERED STRUCTURES AND ARTICLES PREPARED THEREFROM

(71) Applicants: DOW GLOBAL TECHNOLOGIES LLC, Midland, MI (US); ROHM AND HAAS COMPANY, Philadelphia, PA (US)

(72) Inventors: Sekhar Sundaram, Merion Station, PA (US); Debkumar Bhattacharjee, Blue Bell, PA (US); Jozef J. Van Dun, Horgen (CH); Bradley A. Jacobs, Crystal Lake, IL (US); Rajen M. Patel, Lake Jackson, TX (US); Alexander Williamson, Rosharon, TX (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/344,815

(22) PCT Filed: Sep. 19, 2012

(86) PCT No.: PCT/US2012/056002
§ 371 (c)(1),
(2) Date: Mar. 13, 2014

(87) PCT Pub. No.: WO2013/043652
PCT Pub. Date: Mar. 28, 2013

(65) Prior Publication Data
US 2014/0342055 A1    Nov. 20, 2014

Related U.S. Application Data

(60) Provisional application No. 61/536,138, filed on Sep. 19, 2011.

(51) Int. Cl.
*B65D 65/40* (2006.01)
*C09J 7/02* (2006.01)
(Continued)

(52) U.S. Cl.
CPC ............... *B65D 65/40* (2013.01); *B32B 7/12* (2013.01); *B32B 27/08* (2013.01); *B32B 27/32* (2013.01);
(Continued)

(58) Field of Classification Search
CPC ............. C09J 175/04; C09J 2423/006; C09J 2475/00; C09J 7/0275; B32B 27/32; B32B 27/40; B32B 7/12; B32B 2439/70; B32B 2439/80; B05D 65/40; Y10T 428/2896; Y10T 428/2848; Y10T 428/31587
USPC ..................................................... 428/424.8
See application file for complete search history.

(56) References Cited

U.S. PATENT DOCUMENTS 5,047,272 A    9/1991 Hassel et al.
5,654,061 A    8/1997 Visioli
(Continued)

FOREIGN PATENT DOCUMENTS

EP    1559746 A1    8/2005
EP    2233285 A1    9/2010
(Continued)

OTHER PUBLICATIONS

PCT/US2012/056002, International Search Report Written Opinion of the Internatinal Searching Authority, mailed Sep. 17, 2013.
(Continued)

*Primary Examiner* — Thao T Tran

(57) ABSTRACT

The invention provides a layered structure comprising at least two layers: A) a first layer A, formed from a composition A, comprising a polyurethane; and B) a second layer B, formed from a composition B, comprising at least one functionalized polymer B comprising the following: i) at least one polymerized monomeric unit comprising a functional group selected from the group consisting of the following: a) an acid group, b) an anhydride group, c) a primary or secondary amine group, and d) combinations thereof; or ii) at least one reacted functionalization agent comprising a functional group selected from the group consisting of the following: e) an acid group, f) an anhydride group, g) a primary or secondary amine group, and h) combinations thereof; or iii) combinations thereof; and wherein the functionalized polymer B has a number-average molecular weight greater than 1,000 g/mole, and/or a melt index (I2) less than, or equal to, 2500 g/10 min.

17 Claims, 2 Drawing Sheets

(51) Int. Cl.
*B32B 27/40* (2006.01)
*B32B 27/08* (2006.01)
*B32B 27/32* (2006.01)
*B32B 7/12* (2006.01)
*C09J 175/04* (2006.01)

(52) U.S. Cl.
CPC .............. *B32B 27/40* (2013.01); *C09J 7/0275* (2013.01); *C09J 175/04* (2013.01); *B32B 2439/70* (2013.01); *B32B 2439/80* (2013.01); *C09J 2423/006* (2013.01); *C09J 2475/00* (2013.01); *Y10T 428/2848* (2015.01); *Y10T 428/2896* (2015.01)

(56) References Cited

U.S. PATENT DOCUMENTS

| | | |
|---|---|---|
| 6,074,755 A | 6/2000 | Rasmussen et al. |
| 6,607,831 B2 | 8/2003 | Ho et al. |
| 6,630,237 B2 | 10/2003 | Rivett et al. |
| 7,071,280 B2 | 7/2006 | Ikeda et al. |
| 7,097,890 B1 | 8/2006 | Ching et al. |
| 7,101,624 B2 | 9/2006 | Bradley |
| 7,241,481 B2 | 7/2007 | Speer et al. |
| 7,368,171 B2 | 5/2008 | Bushendorf et al. |
| 8,076,000 B2 * | 12/2011 | Domine ................ 428/414 |
| 8,653,191 B2 | 2/2014 | Ansems et al. |
| 2002/0010328 A1 | 1/2002 | Reeves et al. |
| 2002/0106466 A1 | 8/2002 | Hausmann et al. |
| 2004/0116643 A1 | 6/2004 | Kurihashi et al. |
| 2004/0241474 A1 | 12/2004 | Domine |
| 2010/0010156 A1 | 1/2010 | Kollbach et al. |
| 2010/0093942 A1 | 4/2010 | Silvis et al. |
| 2010/0143651 A1* | 6/2010 | Silvis ................ B32B 27/08 428/141 |

FOREIGN PATENT DOCUMENTS

| | | |
|---|---|---|
| JP | 3086539 A | 4/1991 |
| JP | 2001152127 A | 6/2001 |
| JP | 2000167973 | 12/2001 |
| JP | 2002316396 | 5/2004 |
| JP | 2004-249656 A | 9/2004 |
| JP | 2006021530 A | 1/2006 |
| JP | 03780741 B2 | 5/2006 |
| JP | 03918404 B2 | 5/2007 |
| JP | 03959967 B2 | 8/2007 |
| JP | 2009142997 | 7/2009 |
| JP | 04402414 B2 | 1/2010 |
| JP | 04407144 B2 | 2/2010 |
| JP | 04496564 B2 | 7/2010 |
| JP | 2010264677 A | 11/2010 |
| JP | 2011016232 A | 1/2011 |
| JP | 2010-36413 A | 9/2011 |
| JP | 11000978 | 7/2012 |

OTHER PUBLICATIONS

PCT/US2012/056002, International Preliminary Report on Patentability, mailed Mar. 25, 2014.

* cited by examiner

LAYERED STRUCTURES AND ARTICLES PREPARED THEREFROM

REFERENCE TO RELATED APPLICATIONS

The present application claims the benefit of U.S. Provisional Application No. 61/536,138, filed on Sep. 19, 2011, incorporated herein by reference.

BACKGROUND OF THE INVENTION

In 'two-component' curable polyurethane adhesives, one component is an "isocyanate group containing component," and the other component is a component that contains one or more compounds with plural active hydrogens. The "two-component adhesive" is prepared by mixing the two components together, and the mixture is then applied to two or more substrates. Some "two-component" adhesive formulations contain one or more monomeric, aromatic isocyanate compounds, which are usually di-functional, and one or more polyols. Such formulations are capable of undergoing chemical reactions that form urethane polymers, and these reactions are typically useful curing reactions. The monomeric, aromatic isocyanates react to form polymers and/or crosslinks that strengthen the adhesive bond.

These polyurethane adhesives are sometimes used to hold together two or more substrates, to form a bonded assembly for use in food containers. Even though the adhesive is cured, some monomeric isocyanate compounds may be present in the bonded assembly. The presence of monomeric isocyanate compounds is considered to be undesirable, since these compounds are considered to be both toxic and reactive. Also, these compounds are capable of reacting with water to form amines. For example, excess monomeric isocyanate may react with water (for example, trapped water formed during the coating of the adhesive, or water from an atmosphere under high humidity) to form a primary amine (see FIG. 1). Such amines are considered to be undesirable. Among such amines, primary aromatic amines (PAAs) are considered especially undesirable. For food containers, it is desired that contact between the container and the food does not result in appreciable amounts of PAAs in the food.

Whether a bonded assembly contributes to the presence of PAAs in food is generally tested by exposing the bonded assembly to dilute acetic acid for a certain test period. The dilute acetic acid acts as a "simulant" (that is, it simulates the action of food). During the test period, PAAs present in the bonded assembly may migrate into the simulant. Also during that time, monomeric aromatic isocyanate compounds in the material, under test, may also migrate into the simulant, and react with the simulant to form a PAA.

Subsequently, the simulant may be analyzed for the total concentration of all PAAs. That concentration is herein called the "PAA level."

It is desirable that a bonded assembly has low PAA level. In the past, it was common for a bonded assembly, made using a "two-component" polyurethane adhesive, to have an appreciable amount of monomeric aromatic isocyanate present, even after the formation of the bonded assembly, and the curing reaction of the adhesive, were considered complete. Such a bonded assembly typically had a high PAA level.

In the past, one approach to providing a bonded assembly with a low PAA level was to placed the manufactured assembly in storage, prior to the use of the bonded assembly in a food packaging application. The concentration of monomeric isocyanate will normally decline, while the bonded assembly is in storage. It is thought that water in the atmosphere diffuses into the adhesive and reacts with isocyanate groups. These reactions result in formation of PAA which may further react with other "isocyanate group-containing molecules" to form relatively innocuous urea-type compounds. Therefore, as the isocyanate groups react with water, the amount of monomeric, aromatic isocyanate decreases, and the PAA level also decreases. In the past, storage times of 14 days, or more, have often been required, before the PAA level became acceptably low. There is a need amongst manufacturers of food packaging to reduce the level of PAA to acceptably low levels, within a short period of time, to eliminate long storage times. Thus, there is a need for new forms of food packaging that will effectively scavenge such PAAs.

JP2010-264677 discloses a laminate that has an adhesive layer and a sealant layer sequentially provided on a plastic base material. The adhesive layer contains an isocyanate compound (85 wt % or more) having two or more isocyanate groups and a polydimethyl-siloxane compound (0.01-0.5 wt %). The laminate is used for material for packaging foodstuffs and pharmaceuticals.

JP2010-36413A discloses a laminate having a three-layered structure comprising the following: a layer (A) containing a resin composition containing an olefin polymer and a tertiary polyoxyethylene alkylamine; layer (B) containing polyurethane adhesive and an isocyanate-type adhesive; and layer (C) containing a base material. The laminate film is disclosed as useful for a packaging film for foodstuffs and other materials.

U.S. Pat. No. 6,607,831 discloses a multi-layered article comprising a first layer of a thermoset polyurethane, and a second layer of a polymeric composition, which is bonded to the first layer. The polyurethane has available isocyanate groups prior to the application of the second layer. The second layer is applied onto the first layer in a pre-polymeric or polymeric state, wherein the material has carboxyl groups and a cross-linking agent.

Additional films, laminates and/or compositions are disclosed in the following references: JP2002316396A, JP03918404B2, JP2001152127A, JP04496564B2, JP04407144B2, JP03959967B2 (Abstract), JP03918404B2, JP2000167973A, JP2009142997A, JP03780741B2, JP11000978A, JP3086539A, JP2011016232A, JP2006021530A, JP04402414B2, US20040116643, US20020103284, US20100010156, US20100093942, U.S. Pat. No. 7,101,624, U.S. Pat. No. 7,097,890, U.S. Pat. No. 7,241,481, U.S. Pat. No. 7,368,171, U.S. Pat. No. 7,071,280, U.S. Pat. No. 5,654,061, U.S. Pat. No. 5,047,272, WO 02/16221, WO 97/03821, WO 08/079784, WO 08/080111 and EP1559746A1.

However, as discussed above, there remains a need for new forms of food packaging that will effectively scavenge PAAs. These needs have been met by the following invention.

SUMMARY OF THE INVENTION

The invention provides a layered structure comprising at least two layers:

A) a first layer A, formed from a composition A, comprising a polyurethane; and

B) a second layer B, formed from a composition B, comprising at least one functionalized polymer B comprising the following:
  i) at least one polymerized monomeric unit comprising a functional group selected from the group consisting of the following:
    a) an acid group,
    b) an anhydride group, c) a primary or secondary amine group, and
d) combinations thereof; or
ii) at least one reacted functionalization agent comprising a functional group selected from the group consisting of the following:
e) an acid group,
f) an anhydride group,
g) a primary or secondary amine group, and
h) combinations thereof; or
iii) combinations thereof; and wherein the functionalized polymer B has a number-average molecular weight greater than 1,000 g/mole, and/or a melt index (I2) less than, or equal to, 2500 g/10 min.

DETAILED DESCRIPTION OF THE INVENTION

Figure 1:
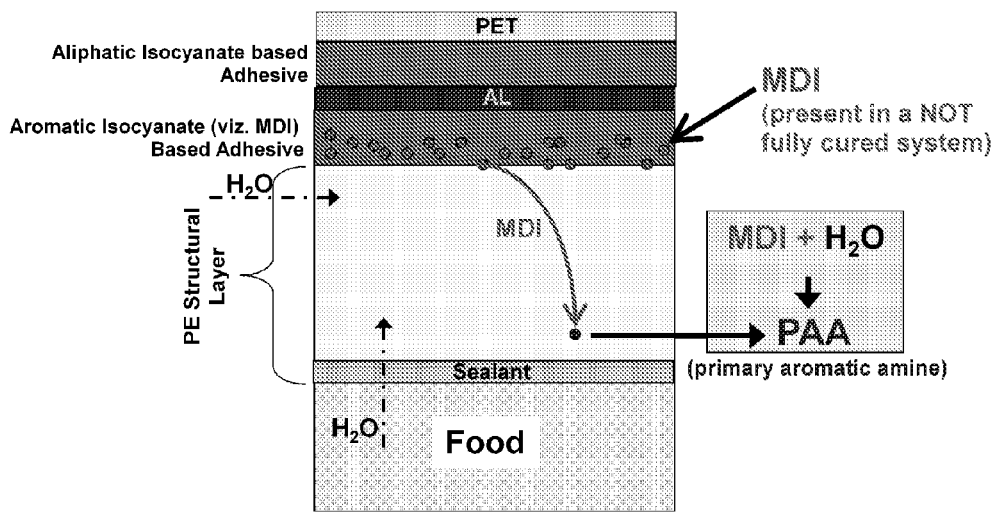
FIG. 1 depicts a schematic of a layered structure, in which one layer contains MDI (methylene diphenyl diisocyanate), which can migrate through the layered structure, or hydrolyze, to form methylene diphenyl diamine, which is a primary aromatic amine, which can also migrate through the layered structure

As discussed above, the invention provides a layered structure comprising at least two layers:

A) a first layer A, formed from a composition A, comprising a polyurethane; and
B) a second layer B, formed from a composition B, comprising at least one functionalized polymer B comprising the following:
  i) at least one polymerized monomeric unit comprising a functional group selected from the group consisting of the following:
    a) an acid group,
    b) an anhydride group,
    c) a primary or secondary amine group, and
    d) combinations thereof; or
  ii) at least one reacted functionalization agent comprising a functional group selected from the group consisting of the following:
    e) an acid group,
    f) an anhydride group,
    g) a primary or secondary amine group, and
    h) combinations thereof; or
  iii) combinations thereof; and wherein the functionalized polymer B has a number-average molecular weight greater than 1,000 g/mole, and/or a melt index (I2) less than, or equal to, 2500 g/10 min.

The layered structure may comprise a combination of two or more embodiments as described herein.

In one embodiment, composition B comprises at least one functionalized polymer B comprising at least one of the following:
  i) at least one polymerized monomeric unit comprising a primary or secondary amine group, or
  ii) at least one reacted functionalization agent comprising a primary or secondary amine group, or
  iii) a combinations thereof.

In one embodiment, functionalized polymer B comprises i) at least one polymerized monomeric unit comprising a functional group selected from the group consisting of the following: a) an acid group, b) an anhydride group, c) a primary or secondary amine group, and d) combinations thereof.

In one embodiment, functionalized polymer B comprises i) at least one polymerized monomeric unit comprising a functional group selected from group a).

In one embodiment, functionalized polymer B comprises i) at least one polymerized monomeric unit comprising a functional group selected from group b).

In one embodiment, functionalized polymer B comprises i) at least one polymerized monomeric unit comprising a functional group selected from group c).

In one embodiment, functionalized polymer B comprises ii) at least one reacted functionalization agent comprising a functional group selected from the group consisting of the following: e) an acid group, f) an anhydride group, g) a primary or secondary amine group, and h) combinations thereof.

In one embodiment, functionalized polymer B comprises ii) at least one reacted functionalization agent comprising a functional group selected from the group e).

In one embodiment, functionalized polymer B comprises ii) at least one reacted functionalization agent comprising a functional group selected from the group f).

In one embodiment, functionalized polymer B comprises ii) at least one reacted functionalization agent comprising a functional group selected from the group g).

In one embodiment, the functionalized polymer B has a melt index (I2) less than, or equal to, 2000 g/10 min, or less than, or equal to, 1500 g/10 min, or less than, or equal to 1000 g/10 min.

In one embodiment, the functionalized polymer B has a melt index (I2) less than, or equal to, 500 g/10 min, further less than, or equal to, 200 g/10 min, further less than, or equal to 100 g/10 min.

In one embodiment, the functionalized polymer B has a melt index (I2) less than, or equal to, 50 g/10 min, further less than, or equal to, 20 g/10 min, further less than, or equal to 10 g/10 min.

In one embodiment, the functionalized polymer B has a melt index (I2) greater than, or equal to, 0.10 g/10 min, further greater than, or equal to, 0.20 g/10 min, further greater than, or equal to 0.50 g/10 min.

In one embodiment, the functionalized polymer B has a number average molecular weight of greater than 2,000 g/mole, or greater than 5,000 g/mole or greater than 10,000 g/mole.

In one embodiment, the functionalized polymer B has a number average molecular weight greater than 1,000 g/mole, further greater than 1,500 g/mole, further greater than 2,000 g/mole.

In one embodiment, the functionalized polymer B has a number average molecular weight greater than 11,000 g/mole, further greater than 12,000 g/mole, further greater than 15,000 g/mole.

In one embodiment, the functionalized polymer B has a number average molecular weight greater than 25,000 g/mole, further greater than 35,000 g/mole, further greater than 50,000 g/mole.

In one embodiment, the functionalized polymer B has a number average molecular weight less than 1,00,000 g/mole, further less than 500,000 g/mole, further less than 200,000 g/mole.

In one embodiment, the functionalized polymer B has a number average molecular weight from 10,000 to 50,000 g/mole, further from 11,000 to 40,000 g/mole, and further from 12,000 to 30,000 g/mole.

In one embodiment, the functionalized polymer B is a functionalized olefin-based polymer B.

In one embodiment, the functionalized olefin-based polymer B is a functionalized ethylene-based polymer B.

In one embodiment, the functionalized ethylene-based polymer B has a melt index (I2) from 0.1 to 50 g/10 min, or from 0.1 to 30 g/10 min, or from 0.1 to 15 g/10 min, or from 0.2 to 5 g/10 min, or from 0.5 to 3 g/10 min.

In one embodiment, the functionalized ethylene-based polymer B has a density from 0.910 to 0.960 g/cc, or from 0.915 to 0.955 g/cc, or from 0.920 to 0.950 g/cc.

In one embodiment, the functionalized olefin-based polymer B is a propylene-based polymer B.

In one embodiment, the functionalized propylene-based polymer B has a melt flow rate (MFR) from 0.1 to 50 g/10 min, or from 0.1 to 30 g/10 min, or from 0.1 to 10 g/10 min, or from 0.2 to 5 g/10 min, or from 0.5 to 3 g/10 min.

In one embodiment, the functionalized propylene-based polymer B has a density from 0.850 to 0.910 g/cc, or from 0.860 to 0.900 g/cc, or from 0.870 to 0.890 g/cc.

In one embodiment, the functionalized polymer B comprising at least one polymerized monomeric unit, or reacted functionalization agent, each comprising a functional group selected from —$CO_2H$, —$SO_3H$, —$PO_3H_2$, aromatic hydroxyl, or a combination thereof.

In one embodiment, the functionalized polymer B comprising at least one polymerized monomeric unit comprising a functional group selected from —$CO_2H$, —$SO_3H$, —$PO_3H_2$, aromatic hydroxyl, or a combination thereof.

In one embodiment, the functionalized polymer B comprising at least one reacted functionalization agent comprising a functional group selected from —$CO_2H$, —$SO_3H$, —$PO_3H_2$, aromatic hydroxyl, or a combination thereof.

In one embodiment, the functionalized polymer B comprising at least one polymerized monomeric unit or reacted functionalization agent, each comprising a —$CO_2H$.

In one embodiment, the functionalized polymer B comprising at least one polymerized monomeric unit comprising a —$CO_2H$.

In one embodiment, the functionalized polymer B comprising at least one reacted functionalization agent comprising a —$CO_2H$.

In one embodiment, the functionalized polymer B comprising at least one polymerized monomeric unit or reacted functionalization agent, each comprising a functional group selected from maleic anhydride, succinic anhydride, or a combination thereof.

In one embodiment, the functionalized polymer B comprising at least one polymerized monomeric unit comprising a functional group selected from maleic anhydride, succinic anhydride, or a combination thereof.

In one embodiment, the functionalized polymer B comprising at least one reacted functionalization agent comprising a functional group selected from maleic anhydride, succinic anhydride, or a combination thereof.

In one embodiment, the functionalized polymer B comprising at least one polymerized monomeric unit or reacted functionalization agent, each comprising a primary amine.

In one embodiment, the functionalized polymer B comprising at least one polymerized monomeric unit comprising a primary amine.

In one embodiment, the functionalized polymer B comprising at least one reacted functionalization agent comprising a primary amine.

In one embodiment, the functionalized polymer B comprising at least one polymerized monomeric unit or reacted functionalization agent, each comprising a secondary amine.

In one embodiment, the functionalized polymer B comprising at least one polymerized monomeric unit comprising a secondary amine.

In one embodiment, the functionalized polymer B comprising at least one reacted functionalization agent comprising a secondary amine.

Suitable primary-secondary diamines used in the synthesis of reacted functionalization agents containing pendent secondary amine groups include compounds of structure (I):

$$H_2N—R_1—NH—R_2 \qquad (I).$$

In structure (I), $R_1$ is a divalent hydrocarbon radical, and preferably a linear hydrocarbon of the formula —$(CH_2)_n$—, where n is greater than, or equal to, 2, and preferably n is from 2 to 10, more preferably from 2 to 8, and even more preferably from 2 to 6. $R_2$ is a monovalent hydrocarbon radical containing at least 1 carbon atoms, and optionally may be substituted with a heteroatom containing group, such as OH or SH. Preferably, $R_2$ a linear hydrocarbon of the formula —$(CH_2)_n$—$CH_3$, where n is from 0 to 10, and preferably n is from 0 to 7, more preferably from 0 to 3, and even more preferably from 0 to 1.

In one embodiment, the functional group is present in an amount of less than or equal to 3.50 moles per kilogram of functionalized polymer B.

The amount of functional group, expressed in "moles/kg," is calculated by dividing the weight of the functional group (determined from moles of functional group in the polymer; for example a titration method), per kilogram of polymer, by the molecular weight of the functional group.

The amount of functional group can also be calculated by dividing the weight of the polymerized monomeric unit or reacted functionalization agent (or its reaction product such as hydrolysis product), per kilogram of polymer, by the molecular weight of the polymerized monomeric unit or reacted functionalization agent (or its reaction product, such as hydrolysis product), followed by multiplying by the number of functional groups per polymerized monomeric unit or reacted functionalization agent (or its reaction product, such as hydrolysis product).

In one embodiment, the functionalized polymer B comprising at least one polymerized monomeric unit comprising the functional group, and the functional group is present in an amount less than, or equal to, 3.50 mole functional group per kg of polymer B.

In one embodiment, the functionalized polymer B comprising at least one polymerized monomeric unit comprising the functional group, and the functional group is present in an amount less than, or equal to 1.40 mole of functional group per kg of polymer B.

In one embodiment, the functionalized polymer B comprising at least one polymerized monomeric unit comprising the functional group, and the functional group is present in an amount less than, or equal to, 1.00 mole of functional group per kg of polymer B.

In one embodiment, the functionalized polymer B comprising at least one polymerized monomeric unit comprising the functional group, and the functional group is present in an amount less than, or equal to, 0.70 mole of functional group per kg of polymer B.

In one embodiment, the functionalized polymer B comprising at least one polymerized monomeric unit comprising the functional group, and the functional group is present in an amount greater than, or equal to 0.05 mole of functional group per kg of polymer B.

In one embodiment, the functionalized polymer B comprising at least one polymerized monomeric unit comprising the functional group, and the functional group is present in an amount greater than, or equal to 0.10 mole, further greater than, or equal to 0.20 mole, of functional group per kg of polymer B.

In one embodiment, the functional group is present in an amount of less than or equal to 0.20 moles of functional group per square meter of layer B.

In one embodiment, the number of moles of functional group present in "1 $m^2$" of Layer B is present in amount from 0.00005 to 0.20 moles/$m^2$, or from 0.0001 to 0.10 moles/$m^2$, or from 0.0001 to 0.01 moles/$m^2$, or from 0.0001 to 0.005 moles/$m^2$.

In one embodiment, the layered structure comprises 0.00005 to 0.04, further from 0.0001 to 0.02, and further from 0.0002 to 0.01 total moles functional groups per $m^2$ of layer B.

In one embodiment, the functionalized polymer B comprising at least one reacted functionalization agent comprising the functional group, and the functional group is present in an amount less than, or equal to, 3.50 mole of functional group per kg of polymer B.

In one embodiment, the functionalized polymer B comprising at least one reacted functionalization agent comprising the functional group, and the functional group is present in an amount less than, or equal to, 1.40 mole of functional group per kg of polymer B.

In one embodiment, the functionalized polymer B comprising at least one reacted functionalization agent comprising the functional group, and the functional group is present in an amount less than, or equal to, 1.00 mole of functional group per kg of polymer B.

In one embodiment, the functionalized polymer B comprising at least one reacted functionalization agent comprising the functional group, and the functional group is present in an amount less than, or equal to, 0.70 mole of functional group per kg of polymer B.

In one embodiment, the functionalized polymer B comprising at least one reacted functionalization agent comprising the functional group, and the functional group is present in an amount greater than, or equal to 0.05 mole of functional group per kg of polymer B.

In one embodiment, the functionalized polymer B comprising at least one reacted functionalization agent comprising the functional group, and the functional group is present in an amount greater than, or equal to 0.10 mole, further greater than, or equal to 0.20 mole, of functional group per kg of polymer B.

In one embodiment, the functionalized polymer B is present in an amount from 1 to 50 weight percent, based on the weight of composition B.

In one embodiment, the functionalized polymer B is present in an amount from 1 to 30 weight percent, based on the weight of composition B.

In one embodiment, the functionalized polymer B is present in an amount from 1 to 15 weight percent, based on the weight of composition B.

In one embodiment, the functionalized polymer B has a number average molecular weight (Mn) less than 50,000 g/mole.

In one embodiment, the functionalized polymer B has a number average molecular weight (Mn) greater than, or equal to, 10,000 g/mole, or greater than, or equal to, 12,000 g/mole, or greater than, or equal to, 15,000 g/mole, or greater than, or equal to, 17,000 g/mole.

The functionalized polymer B may comprise a combination of two or more embodiments as described herein.

Layer B may comprise a combination of two or more embodiments as described herein.

Composition B may comprise a combination of two or more embodiments as described herein.

In one embodiment, composition B further comprises a LDPE. In a further embodiment, composition B further comprises an ethylene-based polymer, and preferably an ethylene/α-olefin interpolymer, and more preferably an ethylene/α-olefin copolymer.

In one embodiment, the LDPE is present in an amount from 10 to 30 weight percent, based on the weight of composition B.

In one embodiment, the LDPE has a density from 0.91 to 0.94 g/cc, or from 0.92 to 0.93 g/cc; and a melt index (I2) from 0.1 to 5, or from 0.2 to 2, or from 0.5 to 1 g/10 min.

In one embodiment, the weight ratio of functionalized polymer B to the LDPE is from 0.2 to 1.5, or from 0.4 to 1.2, or from 0.5 to 1.

The LDPE may comprise a combination of two or more embodiments as described herein.

In one embodiment, composition B further comprises an ethylene-based polymer, and preferably an ethylene/α-olefin interpolymer, and more preferably an ethylene/α-olefin copolymer. In a further embodiment, composition B comprises a LDPE.

In one embodiment, the ethylene-based polymer is present in an amount from 60 to 90 weight percent, or from 65 to 85 weight percent, based on the weight of composition B.

The α-olefins include C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include AFFINITY Polyolefin Plastomers, ENGAGE Polyolefin Elastomers, and DOWLEX Polyethylene Resins, all available from The Dow Chemical Company; EXCEED and EXACT polymers available from ExxonMobil Chemical Company; and TAFMER polymers available from the Mitsui Chemical Company.

In one embodiment, the ethylene-based polymer has a density from 0.89 to 0.96 g/cc, or from 0.90 to 0.95 g/cc, or from 0.90 to 0.94 g/cc, or from 0.90 to 0.93 g/cc; and a melt index (I2) from 0.1 to 5, or from 0.2 to 3, or from 0.5 to 2 g/10 min. In a further embodiment, the ethylene-based polymer is an ethylene/α-olefin interpolymer, and further an ethylene/α-olefin copolymer.

In one embodiment, the weight ratio of functionalized polymer B to the ethylene-based polymer is from 0.2 to 1.5, or from 0.4 to 1.2, or from 0.5 to 1. In a further embodiment, the ethylene-based polymer is an ethylene/α-olefin interpolymer, and further an ethylene/α-olefin copolymer.

The ethylene-based polymer may comprise a combination of two or more embodiments as described herein.

An ethylene/α-olefin interpolymer may comprise a combination of two or more embodiments as described herein.

An ethylene/α-olefin copolymer may comprise a combination of two or more embodiments as described herein.

In one embodiment, composition B further comprises a propylene-based polymer. Commercial examples of suitable propylene-based polymers include INSPIRE Performance Polymers available from The Dow Chemical Company.

In one embodiment, the propylene-based polymer is present in an amount from 65 to 95 weight percent, or from 70 to 90 weight percent, based on the weight of composition B.

In one embodiment, the propylene-based polymer has a density from 0.87 to 0.92 g/cc, or from 0.88 to 0.91 g/cc; and a melt flow rate (MFR) from 0.1 to 5, or from 0.2 to 3, or from 0.5 to 2 g/10 min.

In one embodiment, the weight ratio of functionalized polymer B to the propylene-based polymer is from 0.2 to 1.5, or from 0.4 to 1.2, or from 0.5 to 1.

The propylene-based polymer may comprise a combination of two or more embodiments as described herein.

In one embodiment, the polyurethane of composition A is formed from at least one "isocyanate-containing compound," and at least one "hydroxyl group containing compound," wherein the at least one "isocyanate group containing compound" has a molecular weight of less than, or equal to, 500 g/mole. In a further embodiment, the "isocyanate-containing compound" is an aromatic isocyanate.

In one embodiment, the initial molar ratio of isocyanate groups to hydroxyl groups in the polyurethane formulation of composition A is greater than 1.0.

In one embodiment, composition A comprises greater than, or equal to, 80 weight percent, or greater than, or equal to, 90 weight percent, or greater than, or equal to, 95 weight percent, of the polyurethane, based on the weight of composition A.

Composition A may comprise a combination of two or more embodiments as described herein.

Layer A may comprise a combination of two or more embodiments as described herein.

In one embodiment, Layer B has a thickness from 5 to 50 microns.

In one embodiment, Layer A is an exterior layer.

In one embodiment, Layer A is an interior layer.

In one embodiment, the sum thickness of Layer A and Layer B is greater than, or equal to, 40 percent of the total thickness of the layered structure.

In one embodiment, the sum thickness of Layer A and Layer B is greater than, or equal to, 50 percent of the total thickness of the layered structure.

In one embodiment, the sum thickness of Layer A and Layer B is greater than, or equal to, 70 percent of the total thickness of the layered structure.

In one embodiment, the thickness of Layer B is greater than, or equal to, 20 percent of the total thickness of the layered structure.

In one embodiment, the layered structure further comprises a third Layer C, formed from a composition C, comprising a functionalized olefin-based polymer C, comprising at least one polymerized monomeric unit, or at least one reacted functionalization agent, each comprising a functional group selected from the group consisting of the following: an acid group, an anhydride group, a primary or secondary amine group, a hydroxyl group, and combinations thereof. In a further embodiment, the functional group is selected from the group consisting of the following: an acid group, an anhydride group, a primary or secondary amine group, and combinations thereof.

In one embodiment, the functional group of the functionalized olefin-based polymer C is selected from the group consisting of the following: COOH, primary or secondary amine, aromatic OH, $SO_3H$, anhydride, and combinations thereof.

In one embodiment, functionalized olefin-based polymer C is a functionalized ethylene-based polymer C. In a further embodiment, the functional group is present in an amount greater than, or equal to 0.10 mole, further greater than, or equal to 0.20 mole, of functional group per kg of polymer C.

In one embodiment, the functionalized ethylene-based polymer C has a melt index (I2) from 0.1 to 50 g/10 min, or from 0.1 to 30 g/10 min, or from 0.1 to 15 g/10 min, or from 0.2 to 5 g/10 min, or from 0.5 to 3 g/10 min.

In one embodiment, the functionalized ethylene-based polymer C has a density from 0.910 to 0.960 g/cc, or from 0.915 to 0.955 g/cc, or from 0.920 to 0.950 g/cc.

In one embodiment, the functionalized olefin-based polymer C is a propylene-based polymer C. In a further embodiment, the functional group is present in an amount greater than, or equal to 0.10 mole, further greater than, or equal to 0.20 mole, of functional group per kg of polymer C.

In one embodiment, the functionalized propylene-based polymer C has a melt flow rate (MFR) from 0.1 to 50 g/10 min, or from 0.1 to 30 g/10 min, or from 0.1 to 10 g/10 min, or from 0.2 to 5 g/10 min, or from 0.5 to 3 g/10 min.

In one embodiment, the functionalized propylene-based polymer C has a density from 0.850 to 0.910 g/cc, or from 0.860 to 0.900 g/cc, or from 0.870 to 0.890 g/cc.

In one embodiment, the thickness of Layer C is greater than, or equal to, 10 percent, or greater than, or equal to, 20 percent of the total film thickness.

In one embodiment, the functional group of the functionalized polymer B is COOH, and the functional group of the functionalized olefin-based polymer C is $NH_2$. In a further embodiment, the functionalized polymer B is a functionalized olefin-based polymer.

In one embodiment, the layered structure comprises 0.00005 to 0.04, further from 0.0001 to 0.02, and further from 0.0002 to 0.01 total moles functional groups per $m^2$ of layer B and layer C.

In one embodiment, the functionalized polymer B has greater than, or equal to, 10 percent more of functional group (in moles/kg), compared to the amount of functional group in the functionalized olefin-based polymer C.

The functionalized olefin-based polymer C may comprise a combination of two or more embodiments as described herein.

Layer C may comprise a combination of two or more embodiments as described herein.

Composition C may comprise a combination of two or more embodiments as described herein.

In one embodiment, the sum thickness of Layer B and Layer C is greater than, or equal to, 70 percent of the total thickness of the layered structure.

In one embodiment, the functionalized polymer B and the functionalized olefin-based polymer C are each, independently, functionalized ethylene-based polymers.

In one embodiment, the functionalized polymer B and the functionalized olefin-based polymer C are each, independently, functionalized propylene-based polymers.

In one embodiment, the layer B is located between the layer A and the layer C.

In one embodiment, the layer C is located between the layer A and the layer B.

In one embodiment, layer A is not adjacent to (in contact with) layer B.

In one embodiment, the layered structure comprises less than 0.05 weight percent of iron hydroxyoxide particles and/or iron oxide particles, based on the weight of the layered structure.

The invention also provides an article formed from an inventive layered structure.

In one embodiment, the article further comprises a perishable material.

In one embodiment, second layer B is adjacent to the perishable material.

In one embodiment, the second layer B is adjacent to another layer, which is adjacent to the perishable material.

In one embodiment, layer B is adjacent to layer A.

In one embodiment, layer B and layer C are each located between layer A and the perishable material.

In one embodiment, the perishable material is selected from food products or pharmaceutical products.

In one embodiment, the article is a laminate.

In one embodiment, the layered structure further comprises a polyester, aluminum, or a combination thereof.

The layered structure may comprise a combination of two or more embodiments as described herein.

A layer within the layered structure (for example, Layer A, Layer B, or Layer C) may each, independently, comprise a combination of two or more embodiments as described herein.

An inventive article may comprise a combination of two or more embodiments as described herein.

Functionalized Polymers

Functionalized polymer B includes, but is not limited to, functionalized olefin-based polymers, such as functionalized ethylene-based polymers and functionalized propylene-based polymers; and functionalized acrylic polymers, such as copolymers of alkyl (meth)acrylates and (meth)acrylic acid; and styrenic polymers, such as copolymers of styrene and (meth)acrylic acid or maleic acid, or polystyrenesulphonic acid; and other polymers, such as polybutadiene-co-maleic acid, and polyvinylphosphonic acid, and polyethylene imine, and terminally functionalized polyalkyleneoxides, and polyaromatic alcohols such as NOVOLAC resins.

Functionalized olefin-based polymers include, but are not limited to, functionalized ethylene-based polymers and functionalized propylene-based polymers. Some polar groups that serve as the functionalization moiety include, for example, carboxylic acid (for example, PE-co-AA, PE-co-MAA), maleic anhydride (for example, PE-gr-MAH), and amine.

Additional functionalized olefin-based polymers include, but are not limited to, ethylene acrylic acid copolymers (EAA); maleic anhydride grafted olefin-based polymer; ethylene methacrylic acid copolymers (EMAA).

Additional functionalized olefin-based polymers include polymers comprising a terminal functional group such as carboxylic acid, maleic anhydride, or amine.

In one embodiment, the functionalized olefin-based polymer is an amine functionalized polymer.

In one embodiment, the functionalized olefin-based polymer is a high pressure, free-radical initiated, highly branched ethylene-based polymer, such as, ethylene-acrylic acid (EAA) copolymers.

In one embodiment, the functionalized olefin-based polymer comprises from 0.1 moles/kg to 3.50 moles/kg of carboxylic acid functional groups (based on total weight of functionalized polymer B). In a further embodiment, the functionalized olefin-based polymer is an ethylene-based polymer. In another embodiment, the functionalized olefin-based polymer is a propylene-based polymer.

In one embodiment, the functionalized olefin-based polymer is a functionalized ethylene-based polymer that comprises units derived from ethylene and an anhydride, and preferably maleic anhydride. In a further embodiment, the units derived from the anhydride, preferably maleic anhydride, are present in an amount greater than, or equal to, 0.05 moles/kg, or greater than, or equal to 0.10 moles/kg, based on the total weight of the functionalized polymer.

In one embodiment, the functionalized olefin-based polymer is a functionalized propylene-base polymer that comprises units derived from propylene and an anhydride, and preferably maleic anhydride. In a further embodiment, the units derived from the anhydride, preferably maleic anhydride, are present in an amount greater than, or equal to, 0.05 moles/kg, preferably greater than, or equal to 0.10 moles/kg, based on the total weight of the functionalized polymer.

In one embodiment, the functionalized olefin-based polymer is a functionalized ethylene-base polymer, selected from the group consisting of polyethylene acrylic acid copolymer, an anhydride grafted polyethylene, polyethylene methacrylic acid, and combinations thereof.

In one embodiment, the functionalized olefin-based polymer is a functionalized ethylene-base polymer, selected from the group consisting of polyethylene acrylic acid copolymer, an anhydride grafted polyethylene, and combinations thereof.

In one embodiment, the functionalized olefin-based polymer is a functionalized ethylene-based polymer that comprises at least one polar group, selected from moieties such as carboxylic acid, anhydride, dicarboxylic acid, or amine.

In one embodiment, the functionalized olefin-based polymer is a functionalized propylene-based polymer that comprises at least one polar group, selected from moieties such as carboxylic acid, anhydride, dicarboxylic acid, or amine.

In one embodiment, the functionalized olefin-based polymer has a density from 0.86 to 0.96 g/cc, or from 0.87 to 0.95 g/cc, or from 0.88 to 0.94 g/cc. In a further embodiment, functionalized olefin-based polymer is a functionalized ethylene-based polymer. In another embodiment, the functionalized olefin-based polymer is a propylene-based polymer.

In one embodiment, the functionalized olefin-based polymer has a melt index (I2: 2.16 kg/190° C.) from 0.1 g/10 min to 50 g/10 min, or from 0.1 g/10 min to 30 g/10 min. In a further embodiment, functionalized olefin-based polymer is a functionalized ethylene-based polymer.

In one embodiment, the functionalized olefin-based polymer has a melt index (I2 or MFR: 2.16 kg/230° C.) from 0.1 g/10 min to 50 g/10 min, or from 0.1 g/10 min to 30 g/10 min. In a further embodiment, functionalized olefin-based polymer is a functionalized propylene-based polymer.

Suitable commercial functional polymers include, but are not limited to, PRIMACOR and AMPLIFY polymers available from The Dow Chemical Company; and other commercial polymers, such as the NUCREL (available from DuPont), BYNEL (available from DuPont).

The functionalized olefin-based polymers described herein are also suitable polymers for functionalized olefin-based polymer C.

A functionalized polymer may comprise a combination of two or more embodiments as described herein.

A functionalized olefin-based polymer may comprise a combination of two or more embodiments as described herein.

A functionalized ethylene-based polymer may comprise a combination of two or more embodiments as described herein.

A functionalized propylene-based polymer may comprise a combination of two or more embodiments as described herein.

Additives

In one embodiment, an inventive composition comprises at least one additive. Suitable additives include, but are not limited to, fillers, antioxidants, UV stabilizers, foaming agents, flame retardants, colorants or pigments, anti-blocking agents, slip-agents, and combinations thereof.

Antioxidants include, but are not limited to, hindered phenols; bisphenols; and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine; hexahydro-1,3,5-tris-β-(3,5-di-t-butyl-4-hydroxyphenyl)propionyl-s-triazine; 2,4,6-tris(n-1,4-dimethylpentyl-phenylene-diamino)-1,3,5-triazine; and tris-(3,5-di-t-butyl-4-hydroxybenzyl)isocyanurate.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "functionalized polymer," as used herein, refers to a polymer that comprises, linked by a covalent bond, a chemical group (chemical substituent) comprising at least one heteroatom. A heteroatom is defined as an atom which is not carbon or hydrogen. Common heteroatoms are oxygen, nitrogen, sulfur, and phosphorus.

The term "functional group," as used herein, refers to a chemical substituent containing at least one heteroatom. A heteroatom is defined as an atom which is not carbon or hydrogen. Common heteroatoms are oxygen, nitrogen, sulfur, and phosphorus.

The term "functionalized olefin-based polymer," as used herein, refers to an olefin-based polymer that comprises, linked by a covalent bond, a chemical group (chemical substituent) comprising at least one heteroatom. A heteroatom is defined as an atom which is not carbon or hydrogen. Common heteroatoms are oxygen, nitrogen, sulfur, and phosphorus.

The term "functionalized ethylene-based polymer," as used herein, refers to an ethylene-based polymer that comprises, linked by a covalent bond, a chemical group (chemical substituent) comprising at least one heteroatom. A heteroatom is defined as an atom which is not carbon or hydrogen. Common heteroatoms are oxygen, nitrogen, sulfur, and phosphorus.

The term "functionalized propylene-based polymer," as used herein, refers to a propylene-based polymer that comprises, linked by a covalent bond, a chemical group (chemical substituent) comprising at least one heteroatom. A heteroatom is defined as an atom which is not carbon or hydrogen. Common heteroatoms are oxygen, nitrogen, sulfur, and phosphorus.

The term "polymerized monomeric unit comprising a functional group (for example, copolymerized acrylic acid, and copolymerized maleic anhydride)," as used herein refers to a chemical unit in a (co/inter)polymer that consists of a polymerized functional comonomer, which was used in the polymerization reaction, and which comprises a functional group as defined above. The functional group may have been modified during or after the polymerization reaction (for example: hydrolysis of a maleic anhydride unit to form a dicarboxylic acid).

The term "reacted functionalization agent comprising a functional group (for example, MAH-grafted to polymer, terminal amino group)," as used herein, refers to a chemical unit containing a functional group, as defined above, and which was not part of a polymerized monomeric unit. This includes graft copolymers, for example the succinic anhydride unit of PE-g-MAH, and terminally functionalized (co)polymers such as the terminal amino group of polyoxyalkyleneamine. The functional group may have been modified during or after the functionalization reaction (for example: hydrolysis of a maleic anhydride unit to form a dicarboxylic acid).

The term "perishable material," as used herein, refers to organic matter which can spoil or decay, or which has a decrease in activity of one or more of its active components over time.

The term "isocyanate-containing compound" refers to an organic compound or polymer, each containing at least one isocyanate group.

The term "hydroxyl-containing compound" refers to an organic compound or polymer, each containing at least one hydroxyl group.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Polymer density is measured in accordance with ASTM D-792-08.

Melt Index

Melt index (I2) of an ethylene-based polymer is measured in accordance with ASTM D-1238-10, condition 190° C./2.16 kg. Melt index (I5) of an ethylene-based polymer is measured in accordance with ASTM D-1238-10, condition 190° C./5.0 kg. Melt index (I10) of an ethylene-based polymer is measured in accordance with ASTM D-1238-10, condition 190° C./10.0 kg. High load melt index (I21) of an ethylene-based polymer is measured in accordance with ASTM D-1238-10, condition 190° C./21.0 kg. For propylene-based polymers, the melt flow rate (MFR) is measured in accordance with ASTM D-1238-10, condition 230° C./2.16 kg.

Gel Permeation Chromatography (GPC)

Conventional GPC measurements can be used to determine the weight-average (Mw) and number-average (Mn) molecular weight of the polymers and functional polymers, as described herein, and to determine the MWD (=Mw/Mn). Samples were analyzed with a high-temperature GPC instrument (Polymer Laboratories, Inc. model PL220).

The method employs the well-known universal calibration method based on the concept of hydrodynamic volume, and the calibration is performed using narrow polystyrene (PS) standards, along with four "mixed A 20 μm columns (PLgel Mixed A from Agilent (formerly Polymer Laboratory Inc.))" operating at a system temperature of 140° C. Samples are prepared at a "2 mg/mL" concentration in 1,2,4-trichlorobenzene solvent. The flow rate is "1.0 mL/min," and the injection size is "100 microliters."

The molecular weight determination is deduced by using narrow molecular weight distribution polystyrene standards (from Polymer Laboratories), in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation: $M_{polyethylene} = a*(M_{polystyrene})^b$.

In this equation, a=0.4316 and b=1.0. Weight average molecular weight (Mw) and number average molecular weight (Mn) are calculated in the usual manners. For example, Mw is calculated (using a computer program, for example, Viscotek TriSEC software version 3.0) according to the following formula: $Mw = \Sigma wi \times Mi$, where wi and Mi are the weight fraction and molecular weight, respectively, of the ith fraction eluting from the GPC column. If needed, samples can be silylated or esterified prior to GPC analysis. A suitable silylation procedure is described in the "Williams and Ward" reference.

Experimental

Study I Polymers used in the film structures of this study are shown in Table 1. One or more stabilizers, anti-blocking agents, and/or slip agents are typically added to each polymer at ppm levels.

TABLE 1

Polymers Used for Film Fabrication

| Materials | Density | MI (g/10 min) | Mn (g/mole) |
|---|---|---|---|
| AFFINITY PL1881G* | 0.901-0.906 | 0.75-1.25 | |
| DOWLEX 5056.01G** | 0.919-0.923 | 0.9-1.20 | |
| DOW LDPE 310E | 0.922-0.925 | 0.65-0.85 | |
| DOW LDPE 312E | 0.922-0.925 | 0.65-0.85 | |
| INSPIRE 114 | 0.900 | 0.35-0.65 | |
| PRIMACOR 1410*** | 0.938 | 1.3-1.6 | 19,870 |

*Ethylene/octene copolymer.
**Ethylene/octene copolymer.
***Ethylene acrylic acid (EAA) copolymer.
MI (Melt Index; I2) PE = 190° C./2.16 kg.
MI (Melt Index; I2 or MFR) PP = 230° C./2.16 kg Acrylic acid (AA) content of PRIMACOR 1410=9.7 weight %, based on weight of polymer.

Moles functional group per kilo of PRIMACOR 1410=1.35 moles COOH/kg polymer. Calculation: 9.7 weight % AA=97 g AA/kg polymer.

97 g/kg divided by 72.06 (Mw AA in g/mol)=1.35 moles AA/kg.

1.35 moles AA/kg multiplied by 1 (one COOH group per AA unit)=1.35 moles COOH/kg.

Other materials used for film fabrication are shown in Table 2. Polyurethane adhesives (laminating adhesives) are shown in Table 3.

TABLE 2

Other Materials Used for Film Fabrication

| Materials | Source | Structure/Composition | Density g/cc |
|---|---|---|---|
| PE P1-09 thickness ~50 μm | TICINO PLAST | 95% LDPE + 5% Ethylene Vinyl Acetate (EVA) | 0.92 |
| HOSTAPHAN RNK (PET) thickness ~12 μm | Mitsubishi | Polyethylene Terephthalate | 0.971-0.921 |
| Soft Lamination Grade Al foil thickness ~12 μm | AMCOR (Alcan) | Aluminum Foil | 0.9235 |
| AB MB (Antiblock Masterbatch) | | 80 wt % "Polyolefin with a density of about 0.90 g/cc" + 20 wt % Silica (SiO2) | |

TABLE 3

Laminating Adhesives

| Adhesive | Source | Details |
| --- | --- | --- |
| MORFREE 698A + C79 | DOW | Solventless two-component polyurethane adhesive system |
| ADCOTE L719 + CR719C | DOW | Two-component, solvent-based polyurethane adhesive |
| ADCOTE 811A + Catalyst 9L10 | DOW | Solvent-based two-component polyurethane adhesive system, based on aliphatic isocyanates |

Three layered film structures are shown in Tables 4A and 4B. The components used to form each film layer were dry blended before extrusion. The film fabrication process is discussed below.

TABLE 4A

Polyethylene-Based Multi-Layer Film Structures (wt %)

| Name | 10 µm Sealant Layer | 30 µm Core Layer | 10 µm Inside Layer |
| --- | --- | --- | --- |
| PE-Ref 1 (PE Control) | Pl1881G + 20% LD312 | 80% 5056.01G + 20% LD312 | 79.5% 5056.01G + 20% LD310 + 0.5% AB MB |
| PE-PAA 1 | Pl1881G + 10% LD312 + 10% PRIMACOR 1410 | 80% 5056.01G + 20% LD312 | 79.5% 5056.01G + 20% LD310 + 0.5% AB MB |
| PE-PAA 2 | Pl1881G + 10% LD312 | 70% 5056.01G + 20% LD312 + 10% PRIMACOR 1410 | 79.5% 5056.01G + 20% LD310 + 0.5% AB MB |

TABLE 4B

Polypropylene Based Multi-layer Film Structures (wt %)

| Name | 10 µm Sealant Layer | 30 µm Core Layer | 10 µm Inside Layer |
| --- | --- | --- | --- |
| PP-Ref 1 (PP Control) | INSPIRE 114 | INSPIRE 114 | INSPIRE 114 + 0.5% AB MB |
| PP-PAA 1 | INSPIRE 114 + 10% PRIMACOR 1410 | INSPIRE 114 | INSPIRE 114 + 0.5% AB MB |

Amount of Acrylic Acid Functionality in Polymer Layer

The weight % AA (acrylic acid) units in a film layer=weight % AA units in pure polymer*(% concentration of polymer in layer/100).

The volume of "1 m$^2$" of film layer (in units of cm$^3$)=100 cm*100 cm*layer thickness (cm).

The total layer weight per m$^2$ in units of "grams per m$^2$"=layer density (g/cm$^3$)*volume of "1 m$^2$ of layer (in units of cm$^3$)."

The approximate amount of acrylic acid monomeric units in film layer (in units of mg/m$^2$)=[Total layer weight/m$^2$]*[Weight % AA units in layer]*10.

Amounts are calculated on the assumption that the density of the layer is 1 g/cm$^3$. The approximate number of moles of acrylic acid in the film layer (in units of moles/m$^2$)=amount of acrylic acid monomeric units in film layer (in units of mg/m$^2$)/1000/molecular weight of acrylic acid (72.06).

PE-PAA 1:

Weight % of acrylic acid monomeric units in layer=0.97%. Approximate amount of acrylic acid monomeric units in layer (sealant layer)=97 mg/m$^2$. Moles functional group/m$^2$ of film=0.001346

PE-PAA 2:

Weight % of acrylic acid in layer=0.97%. Approximate amount of acrylic acid monomeric units in layer (core layer)=291 mg/m$^2$. Moles functional group/m$^2$ of film=0.004038.

PP-PAA 1:

Weight % of acrylic acid in layer=0.97%. Approximate amount of acrylic acid monomeric units in layer (sealant layer)=97 mg/m$^2$. Moles functional group/m$^2$ of film=0.001346.

Film Fabrication

Films were fabricated on a three layer ALPINE coextrusion blown film line. The line was equipped with two 50 mm extruders (of 30 D length) and a core extruder of 65 mm (also of 30 D length). The line was equipped with a tandem winder, and a corona treatment device. The die diameter was 200 mm, with a typical die gap of 1.5 mm. The extruder and die heating temperatures are shown in Table 5. The individual extruder conditions (rpm, melt temperature, and melt pressure) are shown in Table 6. The extruders were operated at a total output of 80 kg/hr, and the take off speed was 17.7 m/min, to achieve a total thickness of 50 micron. The films were corona treated to 40 dyne/cm.

The thickness of each layer was primarily determined by the ratio of the throughputs of the different extruders. For example, if a total film thickness is 90 micron, and the three extruders have equal outputs, then each layer will be 30 micron. The total film thickness was measured on line using a KUNDIG K-300 ECO profiler sensor (based on the capacitance measuring principle for non-conductive materials).

TABLE 5

Extruder and Die Heating Temperatures

| | Temperature ° C. |
| --- | --- |
| Extruder A | 200-240 |
| Extruder B | 200-235 |
| Extruder C | 195-225 |
| Die | 235 |

TABLE 6

Extrusion Parameters

| | | |
| --- | --- | --- |
| Extruder A | Screw Speed | 25.4 rpm |
| | Melt Temperature | 229° C. |
| Extruder B | Screw Speed | 29.9 rpm |
| | Melt Temperature | 232° C. |
| | Melt Pressure | 217 bar |
| Extruder C | Screw Speed | 25.2 rpm |
| | Melt Temperature | 213° C. |
| | Melt Pressure | 190 bar |

Preparation of Pre-Laminates [PET-PU1-Al]

The polyurethane adhesive (PU1) was prepared by combining the polyisocyanate component with the polyol component. Immediately after combining the polyisocyanate component with the polyol component, the adhesive blend (at ambient temperature) was then fed onto the lamination gravure rollers of a Nordmeccanica pilot laminator. The mixed adhesive was then applied to an "in line" corona treated primary web (PET), at a coverage of 3 to 4 g/m², or 1 to 1.2 lbs per ream. The coated web was dried, in the drying section of the laminator, to evaporate the solvent to a residual solvent content of less than 10 mg/m². Next, the adhesive coated primary web was mated to secondary web (Al) to form a pre-laminated film, and then this pre-laminated film was nipped at 60° C., and wound on the finish roll on the Nordmeccanica pilot laminator. The pre-laminates were kept for final curing at 45° C. for seven days.

Preparation of Laminates [Multi-Layered Film Structure (Sealant-Core-Inside)-PU2-(Al-PU1-PET)]

A pre-laminate, as discussed above, was laminated onto a multilayered film structure (see Tables 4A and 4B) using a polyurethane adhesive (PU2), to form a laminate. The primary substrate was a "PET-Alu" pre-laminate," as discussed above, and the secondary substrate was a multilayered film as noted in Tables 4A and 4B.

When a solvent-free polyurethane was used as the adhesive (PU2), this adhesive was used immediately after combining the polyisocyanate component with the polyol component. The adhesive (at ambient temperature) was then fed onto the roll coater of the Nordmeccanica pilot laminator (metered rolls set at 40° C. to 45° C.). The mixed adhesive was then applied to the "in line" corona treated primary web (pre-laminate) at the coverage of 1.6 to 2.2 grams per square meter, or 1 to 1.2 lbs per ream. Next, the adhesive coated primary web was mated to the secondary web (multilayered film structure), which had also been "in line" corona treated, to form a laminated film. This laminated film was nipped and wound on the finish roll on the Nordmeccanica pilot laminator. The laminates were stored at room temperature for a time according to Tables 8 and 9.

Figure 2:
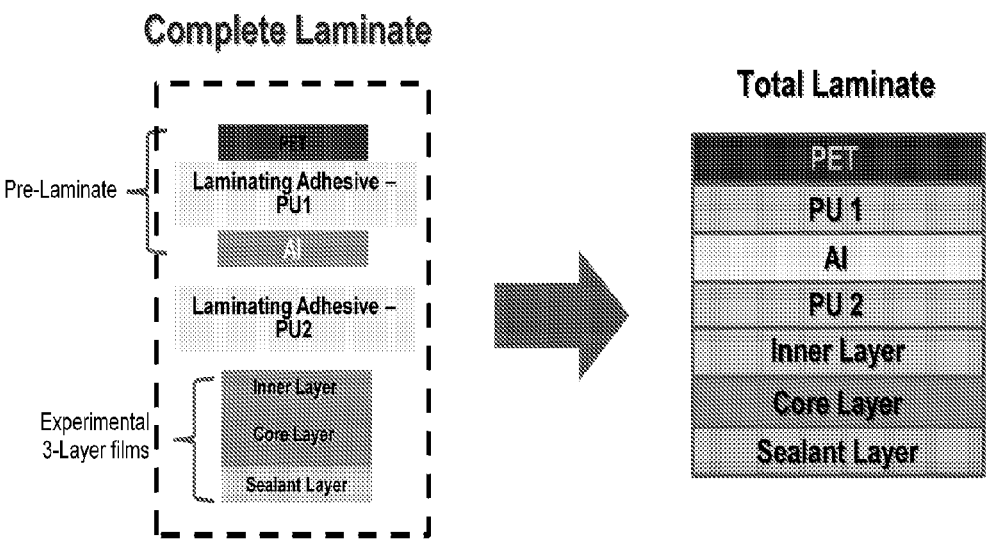
FIG. 2 is a schematic depicting a laminate formed, in part, from an experimental three layer film.

When a solvent-based polyurethane was used as the adhesive (PU2), this adhesive was used immediately after combining the polyisocyanate component with the polyol component. The adhesive blend (at ambient temperature) was then fed onto the gravure rollers of the Nordmeccanica pilot laminator. The mixed adhesive was then applied to an "in line" corona treated primary web (pre-laminate) at the coverage of 3 to 4 g/m², or 1 to 1.2 lbs per ream. The coated web was dried in the drying section of the laminator to evaporate the solvent to a residual solvent content less than 10 mg/m². Next, the adhesive coated primary web was mated to the secondary web (multilayered film structure), which had also been "in line" corona treated to form a laminated film. This laminated film was nipped at 60° C., and wound on the finish roll on the Nordmeccanica pilot laminator. The adhesive lamination conditions are shown in Table 7. A schematic of a final laminate structure is shown in FIG. 2.

TABLE 7

Adhesive Lamination Conditions

| | Details | Adhesive Used | Thickness of adhesive used - final film | Lamination Conditions |
|---|---|---|---|---|
| Pre-laminate | PET (12 micron) + Al (12 micron) | Solvent Based ADCOTE 811A + Catalyst 9L10 (PU1) | 3.5 g/m² | Speed: 50 m/min Tunnel Temp: 80° C./80° C./80° C. in 3 sections Laminating Temp 60° C. |
| Experimental Laminates | Pre-laminate + PE Based Experimental Films (see Table 2) | Solventless MORFREE 698A + C79 (PU2) | 2.1 g/m2 | Machine speed: 50 m/min Adhesive Temp: 40° C.; Laminating Temp: 45° C.; |
| | Pre-laminate + PP Based Experimental Films (see Table 2) | Solvent Based DACOTE L719 + CR719C (PU2) | 3 g/m² | Machine speed: 30 m/min; Tunnel Temp: 80° C./80° C./80° C.; Laminating Temp: 60° C. |

Preparation of Laminate for Bond Data

After the laminates were stored at room temperature for the periods of time shown in Tables 8 and 9, two "15 mm" wide strips were cut from the finished roll of laminate, and bond data for each strip was generated on INSTRON tensile tester, using a separation speed of "100 mm/minute."

Tensile peel tests were performed using ASTM D1876 (ASTM International, West Conshohocken, Pa., USA). The separation speed was 100 mm/min, and sample width was 15 mm. Bond data reported is the average of two specimens tested under appropriate condition (INSTRON). The PET/Al pre-laminate was held in the upper jaw (fixed jaw) and the experimental films in the lower jaw (moving jaw). The results were reported as "N/15 mm of force required to peel the laminate apart." The results are shown in Tables 8 and 9. Failure modes are abbreviated as noted below.

Failure Mode Abbreviations: 1) KoK: cohesive failure in adhesive, 2) KPE: adhesive on PE, 3) KPE/Alu: adhesive on PE and Alu, 4) ta: adhesive remains tacky, 5) l.ta: adhesive remains slightly tacky, 6) str: stretch of film.

TABLE 8

Bond Strength for Acid Functional PE Based Experimental Films*

| No. | Primary Web | Secondary Web | Bond Strength [N/15 mm] 2nd Day |
|---|---|---|---|
| 2 | Pre-structure PET-Alu | PE-Ref 1 + Corona (Film Control) | 5.8 KPE, l.ta str |
| 3 | Pre-structure PET-Alu | PE-PAA1 + Corona | 4.6 KPE l.ta |
| 4 | Pre-structure PET-Alu | PE-PAA2 + Corona | 4.3 KPE l.ta |

*Lamination Adhesive: MOR-FREE 698A + C79 (Mix ratio 100:50; Coat Weight: 2 g/m²).

TABLE 9

Bond Strength for Acid Functional PP Based Experimental Films*

| No. | Primary Web | Secondary Web | Bond Strength [N/15 mm] 10th Day |
|---|---|---|---|
| 6 | Pre-structure PET-Alu | PP-Ref 1 + Corona (Film Control) | 11.7 Kalu |
| 7 | Pre-structure PET-Alu | PP-PAA 1 + Corona | 11.5 Kalu |

*Lamination Adhesive: ADCOTE L719+ + CR 719C4 (Coat Weight: 3.6 g/m$^2$).

For the PE based films, the bond strength was measured (procedure noted above) after two days, and the corresponding failure modes were noted. Adequate bond strength was maintained for the inventive films #3—'PE-PAA1' and #4—TE-PAA2', and these films are suitable for commercial use.

For the PP based films, the bond strength was measured (procedure noted above) after 10 days, and the corresponding failure modes were noted. Adequate bond strength was maintained for the inventive films #7—'PP-PAA1', and this film is suitable for commercial use.

Pouch Preparation and PAA Level Measurement

The level of primary aromatic amines (PAAs), for example MDA (methylene diphenyl diamine) and TDA (toluene diamine/methylphenylene diamine), in a food-simulant, were analyzed by diazotization of the PAAs, so that the concentration of PAAs could be determined colorimetrically. The aromatic amines present in the test solution were diazotized in a chloride solution, and subsequently coupled with N-(1-naphthyl)-ethylene diamine dihydrochloride, giving a violet solution. An enrichment of the color was done with fixed phase extraction columns. The amount of the PAAs was determined photometrically at a wavelength of 550 nm. The concentration of PAAs was noted as "aniline hydrochloride equivalents," and reported as "micrograms of aniline hydrochloride per 100 ml (or 50 ml) of food-simulant per an area of 4 dm$^2$ of interior surface of pouch (sealant layer)."

Figure 3:
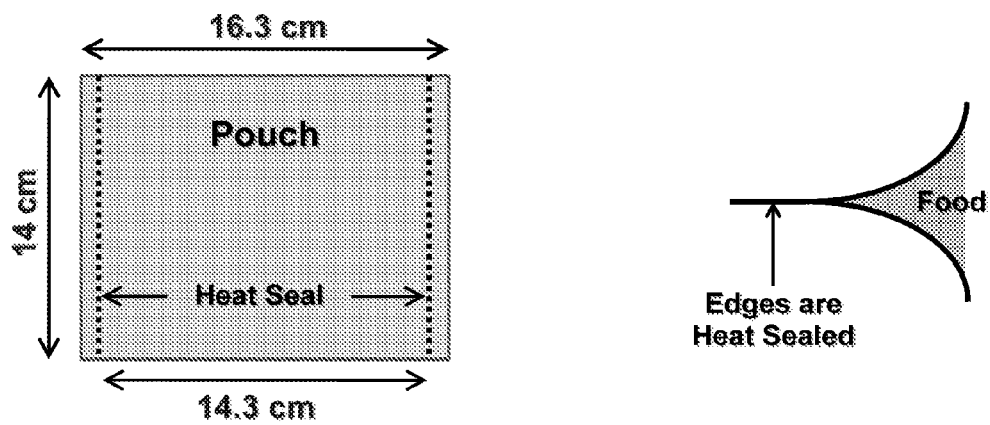
FIG. 3 is a schematic depicting the formation of a pouch from a laminate.

Laminates were prepared as described above. Each pouch was formed by cutting a strip of about "28 cm×16.3 cm," from the middle section (width) of the laminate. Each strip was folded to form a "14 cm×16.3 cm" surface area, and heat sealing an edge of about "1 cm" along each open longitudinal edge of the folded strip was heat sealed, to form a pouch of "14 cm×14.3 cm," excluding the heat sealed edges (see FIG. 3). The film structure of a pouch wall, from interior layer to exterior layer, was as follows: Interior: multi-layered film structure (Sealant-Core-Inside)-PU2-(Al-PU1-PET):Exterior. The equipment used for heat sealing the edges was a Brugger HSG-C. Sealing conditions for PE-based laminates were 1.3 bar, 130° C. Sealing conditions for PP-based laminates were 1.5 bar, 160° C.

Figure 4:
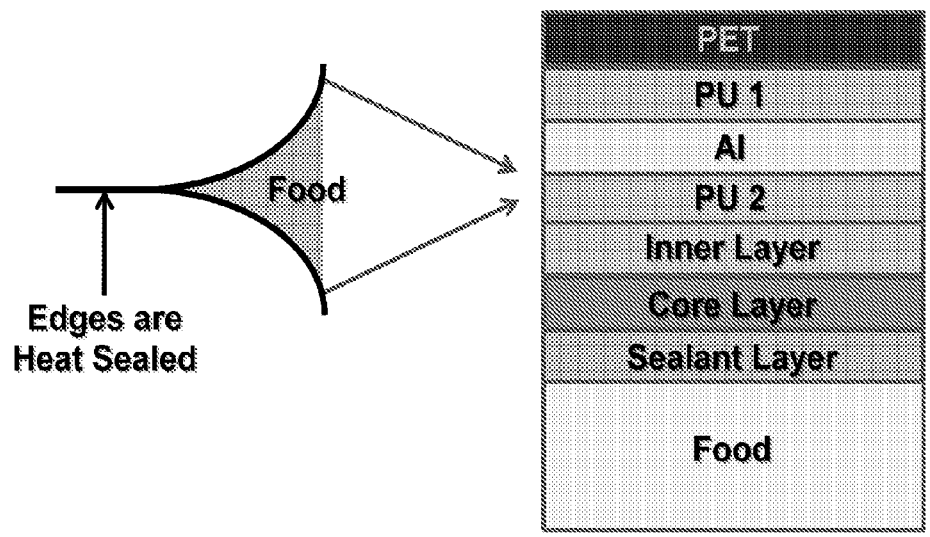
FIG. 4 is another schematic depicting the formation of a pouch from a laminate, which was formed, in part, from an experimental three layer film.

Four pouches (two blanks and two test pouches), each with an inner surface area of about "14.0 cm×14.3 cm" were used for each inventive film in this study (see FIG. 4). For PE-based (ethylene-based polymer) pouches, each pouch was formed after two days from the time of formation of the respective laminate. For the PP-based (propylene-based polymer) pouches, each pouch was formed after 7, 14 and 21 days from the formation of the respective laminate. Two test pouches for each day, and two blank pouches per day, were prepared from each laminate. Prior to forming a pouch, the laminate was stored at room temperature under ambient atmosphere.

Each pouch was filled with "100 ml" of 3% aqueous acetic acid (=the food simulant). These pouches were stored at 70° C., in an air circulation oven, for two hours. After cooling the test solution (contents of the pouch) to room temperature, "100 ml" of test solution was mixed with "12.5 ml" of hydrochloric acid solution (1N) and "2.5 ml" of sodium nitrite solution (0.5 g per 100 ml of solution), and the contents were allowed to react for ten minutes Ammonium sulfamate (5 ml; 2.5 g per 100 ml of aq. solution) was added, and allowed to react for ten minutes. A coupling reagent (5 ml; 1 g of N-(1-naphthyl)-ethylenediamine dihydrochloride per 100 g of aq. solution) was added, and allowed to react for 120 minutes. After each addition, the resulting mixture was stirred with a glass rod. For the "blank pouches," "100 ml" of the test solution was mixed with the derivation reagents as discussed above, except for the sodium nitrite.

The solution was concentrated by elution through an ODS solid phase extraction column (ODS reverse phase, C18 endcapped). The extinction was measured at 550 nm, using a Spectrophotometer Lambda (from Perkin Elmer).

The column was conditioned using, first, "12 ml" of methanol, then "12 ml" elution solvent, and then "12 ml" aqueous hydrochloric acid solution (0.1 N). Each derivatized sample was added to the column using a glass beaker that was previously rinsed twice with "3 ml" of aqueous hydrochloric acid solution (0.1 N) for each rinse. A vacuum (about 2.5 mm Hg) was pulled on the column for one minute to remove all rinse. Then "5 ml" of elution solvent was added to the column, and this step was repeated until "10 ml" of eluent was collected. The extinction (absorption) of the eluent was measured in a "4 cm cuvette" at 550 nm.

To determine the concentration of PAA, the extinction of the reaction product was measured at 550 nm, in a 4 cm cuvett, against the reagent blank solution and a series of standards with known concentrations of aniline hydrochloride, which were processed in parallel. Results are shown in Tables 10 and 11.

For the PE-based film, the PAA level in the food simulant was measured (procedure noted above) after two days. The inventive Films #3 and 4, viz. PE-PAA 1 and PE-PAA 2, respectively, show better PAA reduction after two days compared to the reference Film 2.

For the PP-based films, the PAA level in the food simulant was measured (procedure noted above) as a function of time (7th day, 14th day, 21st day). The inventive Film #7, viz. PP-PAA 1, show better PAA reduction when compared to the reference Film 6, and shows no PAA in the simulant after 21 days.

TABLE 10

PAA Decay Data for Acid Functional PE Based Experimental Films

| No. | Adhesive Used for Lamination (PU2) | Primary Web | Secondary Web | Primary Aromatic Amine (PAA) 2$^{nd}$ Day |
|---|---|---|---|---|
| 2 | MOR-FREE 698A + C79 | Pre-structure PET-Alu | PE-Ref 1 + Corona (Film Control) | 4.62 μg/50 ml |

TABLE 10-continued

PAA Decay Data for Acid Functional PE Based Experimental Films

| No. | Adhesive Used for Lamination (PU2) | Primary Web | Secondary Web | Primary Aromatic Amine (PAA) 2$^{nd}$ Day |
|---|---|---|---|---|
| 3 | Mix ratio 100:50 | Pre-structure PET-Alu | PE-PAA1 + Corona | 3.08 μg/50 ml |
| 4 | Coat Weight: 2 g/m | Pre-structure PET-Alu | PE-PAA2 + Corona | 1.78 μg/50 ml |

TABLE 11

PAA Decay Data for Acid Functional PP Based Experimental Films

| No. | Adhesive Product Used (PU2)* ADCOTE L719 + CR 719C4 | Primary Web | Secondary Web | Primary Aromatic Amine (PAA) | | |
|---|---|---|---|---|---|---|
| | | | | 7th Day | 14th Day | 21st Day |
| 6 | ADCOTE L719 + CR 719C4 | Pre-structure PET-Alu | PP - Ref 1 + Corona (Film Control) | 9.59 μg/ 50 ml | 1.45 μg/ 100 ml | 0.26 μg/ 100 ml |
| 7 | ADCOTE L719 + CR 719C4 | Pre-structure PET-Alu | PP - PAA 1 + Corona | 3.72 μg/ 50 ml | 0.41 μg/ 100 ml | Not detectable |

*Mix ratio 100:50; coat weight: 3.6 g/m².

Study II

AFFINITY PL1881G=ethylene/octene copolymer (The Dow Chemical Company); Density=0.901-0.906; I2=0.75-1.25 g/10 min.

DOWLEX 2056G=ethylene/octene copolymer (The Dow Chemical Company); Density=0.9190-0.9210; I2=0.95-1.05 g/10 min.

LDPE=Density=0.9180-0.9220; I2=0.52-0.78 g/10 min.

INSPIRE 114=polypropylene, density=0.900, MFR=0.35-0.65 g/10 min.

PRIMACOR 3440=ethylene/acrylic acid copolymer (The Dow Chemical Company); Mn=14,500 g/mole; Mw=75,000 g/mole (GPC); acrylic acid content=9.7 weight %; calculated moles functional group per kilogram polymer=1.35 moles COOH/kg polymer.

BHX-10088=Maleic anhydride terminated polypropylene, acid number 40 mgKOH/g. Calculated maleic anhydride content=3.5 weight %. Calculated moles of functional group per kilo=0.356.

Amine-t-PP=A secondary aliphatic amine functional polypropylene resin. Reaction product of BHX-10088 and 3-methylamino(propylamine); Mn approx. 1,850 g/mole.

Amine-g-PE=A secondary aliphatic amine functional polyethylene resin. Reaction product of maleic anhydride grafted PE and 3-methylamino(propylamine). Calculated moles of functional group per kilo=0.102; melt Index=4.95 g/10 min; Mn approx. 15,000 g/mole.

AMPACET 10063=anti-blocking agent from Ampacet.

Synthesis of Maleic Anhydride Terminated Polypropylene/Amine "Amine-t-PP"

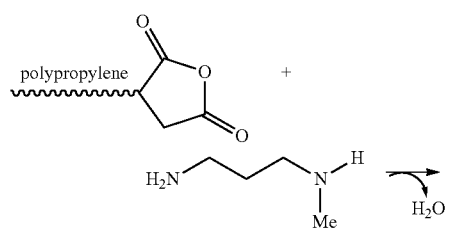

-continued

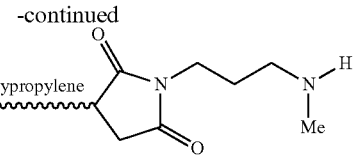

To a 1 liter, three-neck, round bottom flask, equipped with overhead stirring, Dean-Stark trap, and nitrogen inlet, was added 450 mL xylene (Aldrich #294780) and 250 g Baker Hughes BHX-10088 (maleic anhydride terminated polypropylene; Mn=1850, Mw=3880 (GPC)). The contents were heated, and stirred under light nitrogen flow, until all solids were in solution, and then the temperature and flow were increased to "azeotrope off" at least 20 mL of liquid, to remove water, and drive the material to the anhydride form. The reaction temperature was reduced to 90° C., and then three equivalents (25 g) of N-methyl-1,3-propanediamine (Aldrich #127027) was added to the flask. The reaction was allowed to run for at least one hour, then the temperature was increased to 120° C., and the reaction was allowed to proceed for several hours. The reaction solution was sampled by FTIR to confirm completeness of the reaction, and the product was isolated by precipitation into stirred, excess methanol in a large plastic beaker. Solids were allowed to settle out, liquid decanted off, then more methanol was added with stirring. Again, after settling, the liquid was decanted off, and the remaining slurry filtered using a Buchner/aspirator/filter paper set up. The solids were transferred to a pan lined with a thin TEFLON sheet, and dried in a 50° C. oven, under vacuum, overnight. A small sample of dried material was dissolved in hot toluene, and analyzed by FTIR again to characterize the final product. Conversion of anhydride to imide was confirmed by monitoring the carbonyl stretching frequency in FTIR (anhydride ~1790 cm-1→imide ~1710 cm-1).

Synthesis of Secondary Aliphatic Amine Functional Polypropylene Resin "Amine-g-PE"

The products were compounded on a Century-ZSK-40 twin-screw extruder. This was a co-rotating, fully intermeshing, 40-mm twin-screw extruder, with 11 barrel sections for a length of 45:1 L/D. This unit as equipped with a 150 Hp motor drive and 244 maximum amps. The maximum screw speed for the extruder is 1200 rpm. All samples were made with a Gala underwater pelletizer system that was equipped with a 12 hole Gala die (2.362 mm hole diameter) with 4 holes plugged. The cutter had the 4 blade hub.

AMPLIFY GR 202 (commercially available PE-g-MAH resin from Dow) was fed on a model T-35 K-Tron "loss-in-weight" twin screw feeder, with a pair of pellet screws. The amine (3-methylaminopropylamine) was fed on a K-Tron "loss-in-weight" liquid skid, that had a 1.2 CC/Min, and a Zenith gear pump, which was used to inject amines into barrel four after the initial melting of the polymer.

Extrusion conditions are shown in Table 12. Barrel temperatures (in ° C.) were as follows: Barrel 2 (SP=170; actual=170); Barrel 3 (SP=250; actual=237); Barrel 4 (SP=250; actual=244); Barrel 5 (SP=250; actual=221); Barrel 6 (SP=250; actual=252); Barrel 7 (SP=200; actual=193); Barrel 8 (SP=200; actual=197); Barrel 9 (SP=200; actual=199); Barrel 10 (SP=200; actual=184); Barrel 11 (SP=200; actual=194); the die temperature (in ° C.) was as follows: SP=210 and actual=210.

TABLE 12

Reactive extrusion conditions

|  | Sample #1 |
| --- | --- |
| Total feed rate [lb/h] | 152.4 |
| #1 feed rate | 150 |
| Liquid rate [lb/h] | 2.4 |
| Screw RPM | 300 |
| Torque [%] | 52-58 |
| Die pressure [psi] | 449-550 |
| Injection Pressure [psi] | 250 |
| Vacuum pressure [in Hg] | 23 |

The extruder was started by feeding the AMPLIFY GR 202 resin at 150 lb/h. After steady state operation was reached, the gear pump was started to feed in the desired flow rate of amine liquid. Unreacted amine was removed from the system using a vacuum devolatilization system operating at 23 in Hg vacuum. The functionalized resin was solidified in the Gala underwater pelletizing system.

Blends

Compounding was done in advance to make the blends of the functional resins in DOWLEX/LDPE formulation. The samples were compounded using a Werner & Pfleiderer 30 mm twin-screw extruder, a nine barrel, 28:1 L/D machine. The drive was a 15 HP motor with a maximum screw speed of 500 RPM. The extruder had six temperature control zones, including the die, and was water cooled at the feed throat and air cooled for barrels 2-9. The die was a 2-hole 3.2 mm standard die. The water-bath was 10.5 ft long with Huestis pillow-block strand dryers on the end. The pelletizer was a Conair-Jetro model 304. The extruder was fed using "loss-in-weight" Accurate flex-wall single screw feeders with an 8000 controller.

The extruder barrel temperatures were set as shown in Table 13. Once the barrel temperature reached steady state, the extruder was turned on, and the screw speed was ramped up gradually, and fixed at 300-350 revolutions per minute. The pellet blends were dry blended in a plastic bag, according to the weight percent in the Tables 15 and 16, and the mixed pellets were fed into the 30 mm extruder throat by the Accurate "loss-in-weight" feeder. The feed rate of a "loss-in-weight" feeder was set to the desired rate (lb/h). Once the pellets were extruded, two strands forming at the die exit were cooled in a water bath. Strand pelletizing was used for sampling during the compounding.

For the blends containing the non-functional resins, the resins were dry-blended in the ratios shown in Tables 15 and 16 shortly before film fabrication. For the Films 5 and 6 (Table 16), Ampacet was added to the compounded resins shortly before film fabrication.

TABLE 13

Temperature set-points for compounding

| Temp. set-points (° C.) | 90% INSPIRE 114 + 10% amine-t-PP | 70% DOWLEX 2056G + 20% LDPE + 10% amine-g-PE | 49.5% DOWLEX 2056G + 20% LDPE + 30% PRIMACOR 3440 |
| --- | --- | --- | --- |
| Zone #1 | 160 | 160 | 160 |
| Zone #2 | 225 | 225 | 225 |
| Zone #3 | 230 | 230 | 230 |
| Zone #4 | 230 | 230 | 230 |
| Zone #5 | 230 | 235 | 230 |
| Die temp | 230 | 230 | 230 |

Film Fabrication

Films were fabricated on a five layer LAB TECH coextrusion blown film line. The line was equipped with two, 25 mm extruders for the skins, and three core extruders of 20 mm (all of 30 D length). The line was equipped with a dual surface winder, with slitting capability, but no corona treatment device. The die diameter was 75 mm, with a typical die gap of 2.0 mm. The extruder heating temperature for each of Extruders A-E ranged from 190° C.-200° C., and die heating temperature was 235° C. The individual extruder conditions (rpm and melt temperature) are shown in Table 14. The extruders were operated at a total output of 34 #/hr, and the take off speed was 24 ft/min, to achieve a total thickness of 50 micron. These sample films are a three layer (about "20/60/20") structure. Based on the die design and a request for 20% skins, the layer ratio used for each extruder was 20/18/25/18/20. Slit-width=12 inches. Total film thickness=50 microns. Each individual layer was 10 microns thick. Film configurations are listed in Tables 15 and 16.

TABLE 14

Extrusion Parameters

| Extruder A | Screw Speed | 55 rpm |
| --- | --- | --- |
|  | Melt Temperature | 212° C. |
| Extruder B | Screw Speed | 118 rpm |
|  | Melt Temperature | 218° C. |
| Extruder C | Screw Speed | 145 rpm |
|  | Melt Temperature | 213° C. |
| Extruder D | Screw Speed | 126 rpm |
|  | Melt Temperature | 213° C. |
| Extruder E | Screw Speed | 57 rpm |
|  | Melt Temperature | 220° C. |

TABLE 15

Compositions for Film Layers (wt %)

| Film # | Layer 1 (sealant) | Layer 2 | Layer 3 | Layer 4 | Layer 5 |
|---|---|---|---|---|---|
| 1 | INSPIRE 114 | INSPIRE 114 | INSPIRE 114 | INSPIRE 114 | INSPIRE 114 |
| 2* | INSPIRE 114 | 90% INSPIRE 114 + 10% amine-t-PP | 90% INSPIRE 114 + 10% amine-t-PP | 90% INSPIRE 114 + 10% amine-t-PP | INSPIRE 114 |

*Moles of functional groups per square meter of film, for Film # 2 = 0.00107 moles/m².

TABLE 16

Compositions for Film Layers (wt %)

| Film # | Layer 1(sealant) | Layer 2 | Layer 3 | Layer 4 | Layer 5 |
|---|---|---|---|---|---|
| 3 Comp. | 80% AFFINITY PL1881G + 20% LDPE | 80% DOWLEX 2056G + 20% LDPE | 80% DOWLEX 2056G + 20% LDPE | 80% DOWLEX 2056G + 20% LDPE | 79.5% DOWLEX 2056G + 20% LDPE + 0.5% AMPACET 10063 |
| 4 | 80% AFFINITY PL1881G + 20% LDPE | 70% DOWLEX 2056G + 20% LDPE + 10% amine-g-PE | 70% DOWLEX 2056G + 20% LDPE + 10% amine-g-PE | 70% DOWLEX 2056G + 20% LDPE + 10% amine-g-PE | 79.5% DOWLEX 2056G + 20% LDPE + 0.5% AMPACET 10063 |
| 5 | 80% AFFINITY PL1881G + 20% LDPE | 70% DOWLEX 2056G + 20% LDPE + 10% amine-g-PE | 80% DOWLEX 2056G + 20% LDPE | 80% DOWLEX 2056G + 20% LDPE | 49.5% DOWLEX 2056G + 20% LDPE + 30% PRIMACOR 3440 + 0.5% AMPACET 10063 |
| 6 | 80% AFFINITY PL1881G + 20% LDPE | 49.5% DOWLEX 2056G + 20 WT % LDPE + 30% PRIMACOR 3440 + 0.5% AMPACET 10063 | 80 WT % DOWLEX 2056G + 20 WT % LDPE | 80% DOWLEX 2056G + 20% LDPE | 69.5% DOWLEX 2056G + 20% LDPE + 10% amine-g-PE + 0.5% AMPACET 10063 |

Film 2—Calculation of Moles Functional Group/m² Film:

Thickness of layers with functional resin=10+10+10 microns=30 microns=0.003 cm. (100 cm×100 cm×0.003 cm)=30 cm³. Assuming density of film=1 g/cm³, weight of layer=30 g/m².

Resin is present in layer at 10 wt %. Weight of resin/m²=3 g/m². Moles functional groups/kilo resin=0.265 moles/kg. Therefore moles functional groups/m²=0.000795 moles/m².
Total Moles of Functional Groups Per Square Meter of Film:
Film #4=0.000306 moles/m².
Film #5=0.000102 (amine)+0.00405 (acid)=0.004152 moles/m².
Film #6=0.000102 (amine)+0.00405 (acid)=0.004152 moles/m².

Migration Results

Experimental methods for pre-lamination, lamination pouch preparation, and migration testing are described above, for Study I, except that for the experimental laminates, the same adhesive, solventless MORFREE 698A+ C79, was used for the PE and PP films. Migration results are shown in Tables 17 and 18.

TABLE 17

| | ppb aniline equivalents/6 dm²/kg | |
|---|---|---|
| Number of days after lamination | Film # 1 (Comparison) | Film # 2 (Inventive) |
| 2 | 6.1 | 0.3 |
| 3 | 3.7 | 0.27 |
| 7 | 1.0 | 0.22 |

TABLE 18

| | ppb aniline equivalents/6 dm²/kg | | | |
|---|---|---|---|---|
| Number of days after lamination | Film # 3 (Comparison) | Film # 4 (Inventive) | Film # 5 (Inventive) | Film # 6 (Inventive) |
| 1 | 31.02 | 14.95 | 15.74 | 13.8 |
| 2 | 8.58 | 5.26 | 4.06 | 3.52 |

For the "amine-t-PP" containing film (Table 17), the PAA level in the food simulant was measured (procedure noted above) after 2, 3 and 7 days. The inventive Film 2 showed significantly better PAA reduction compared to the reference Film 1.

For the "amine-g-PE" containing films (Table 18), the PAA level in the food simulant was measured (procedure noted above) after 1 and 2 days. Each inventive film (Films 4-6) showed significantly better PAA reduction compared to Film 3.

The invention claimed is:

1. An article comprising a layered structure comprising at least two layers:
   A) a first layer A, formed from a composition A, comprising a polyurethane; and
   B) a second layer B, formed from a composition B, consisting of at least one additive selected from fillers, antioxidants, UV stabilizers, foaming agents, flame retardants, colorants or pigments, anti-blocking agents, slip-agents, and combinations thereof, and one of the following I) of II):
   I) a propylene-based polymer that has a density from 0.88 to 0.91 g/cc and a melt flow rate from 0.1 to 5 g/10 min, and from 1 to 30 weight percent, based on the weight of composition B, of at least one functionalized propylene-based polymer B comprising the following:
  i) at least one polymerized monomeric unit comprising a functional group selected from a primary or secondary amine group;
  ii) at least one reacted functionalization agent comprising a functional group selected from a primary or secondary amine group; or
  iii) combinations thereof; or
II) an ethylene-based polymer that has a density from 0.90 to 0.94 g/cc and a melt index from 0.1 to 5 g/10 min, a LDPE, and from 1 to 30 weight percent, based on the weight of composition B, of at least one functionalized ethylene-based polymer B comprising the following:
  i) at least one polymerized monomeric unit comprising a functional group selected from a primary or secondary amine group;
  ii) at least one reacted functionalization agent comprising a functional group selected from a primary or secondary amine group; or
  iii) combinations thereof; and
wherein the functionalized polymer B has a number-average molecular weight greater than 1,000 g/mole, and/or a melt index (I2) less than, or equal to, 2500 g/10 min; and
wherein Layer B has a thickness from 5 to 50 μm; and
wherein the article further comprises a perishable material.

2. The article-according to claim 1, wherein the functionalized polymer B comprising at least one polymerized monomeric unit or at least one reacted functionalization agent comprising a primary amine.

3. The article according to claim 1, wherein the functional group is present in an amount of less than or equal to 0.20 moles of functional group per square meter of layer B.

4. The article according to claim 1, wherein the polyurethane of composition A is formed from at least one "isocyanate group containing compound," and at least one "hydroxyl group containing compound," and wherein the at least one "isocyanate group containing compound" has a molecular weight of less than, or equal to, 500 g/mole.

5. The article of claim 1, wherein the structure further comprises a third Layer C, formed from a composition C, comprising a functionalized olefin-based polymer C, comprising at least one polymerized monomeric unit, or at least one reacted functionalization agent, each comprising a functional group selected from the group consisting of the following: an acid group, an anhydride group, a primary or secondary amine group, a hydroxyl group, and combinations thereof.

6. The article of claim 1, wherein the layer B is adjacent to the perishable material.

7. The article of claim 1, wherein the layer B is adjacent to another layer, which is adjacent to the perishable material.

8. The article of claim 6, wherein the layer B is adjacent to layer A.

9. The article of any of claim 1, wherein the perishable material is selected from food products or pharmaceutical products.

10. The article of claim 1, wherein the LDPE is present in an amount from 10 to 30 weight percent, based on the weight of composition B.

11. The article of claim 1, wherein the composition B comprises from 1 to 15 weight percent, based on the weight of composition B, of at least one functionalized propylene-based polymer B; or from 1 to 30 weight percent, based on the weight of at least one functionalized ethylene-based polymer B.

12. A film comprising at least two layers:
  A) a first layer A, formed from a composition A, comprising a polyurethane; and
  B) a second layer B, formed from a composition B, consisting of at least one additive selected from fillers, antioxidants, UV stabilizers, foaming agents, flame retardants, colorants or pigments, anti-blocking agents, slip-agents, and combinations thereof, and one of the following I) of II)
  I) a propylene-based polymer that has a density from 0.88 to 0.91 g/cc and a melt flow rate from 0.1 to 5 g/10 min and from 1 to 30 weight percent, based on the weight of composition B, of at least one functionalized propylene-based polymer B comprising the following:
    i) at least one polymerized monomeric unit comprising a functional group selected from a primary or secondary amine group;
    ii) at least one reacted functionalization agent comprising a functional group selected from a primary or secondary amine group; or
    iii) combinations thereof; or
  II) an ethylene-based polymer that has a density from 0.90 to 0.94 g/cc and a melt index from 0.1 to 5 g/10 min, a LDPE, and from 1 to 30 weight percent, based on the weight of composition B, of at least one functionalized ethylene-based polymer B comprising the following:
    i) at least one polymerized monomeric unit comprising a functional group selected from a primary or secondary amine group;
    ii) at least one reacted functionalization agent comprising a functional group selected from a primary or secondary amine group; or
    iii) combinations thereof; and
  wherein the functionalized polymer B has a number-average molecular weight greater than 1,000 g/mole, and/or a melt index (I2) less than, or equal to, 2500 g/10 min; and
  wherein Layer B has a thickness from 5 to 50 μm.

13. The film of claim 12, wherein the film has a thickness from 50 to 90 microns.

14. The film of claim 12, wherein the film further comprises a third Layer C, formed from a composition C, comprising a functionalized olefin-based polymer C, comprising at least one polymerized monomeric unit, or at least one reacted functionalization agent, each comprising a functional group selected from the group consisting of the following: an acid group, an anhydride group, a primary or secondary amine group, a hydroxyl group, and combinations thereof.

15. The film of claim 12, wherein the film further comprises a layer of a polyester, an aluminum, or a combination thereof.

16. The film of claim 12, wherein the LDPE is present in an amount from 10 to 30 weight percent, based on the weight of composition B.

17. The film of claim 12, wherein the composition B comprises from 1 to 15 weight percent, based on the weight of composition B, of at least one functionalized propylene-based polymer B; or from 1 to 30 weight percent, based on the weight of at least one functionalized ethylene-based polymer B.

* * * * *